United States Patent [19]

White et al.

[11] Patent Number: 5,597,866

[45] Date of Patent: Jan. 28, 1997

[54] PROPYLENE POLYMER COMPOSITIONS HAVING IMPROVED IMPACT STRENGTH

[75] Inventors: Donald A. White, Keasbey, N.J.; Hsien-Chang Wang, Bellaire, Tex.; Dongming Li, Webster, N.Y.

[73] Assignee: Exxon Chemical Patents Inc., Wilmington, Del.

[21] Appl. No.: 497,486

[22] Filed: Jun. 30, 1995

[51] Int. Cl.$^6$ .......................... C08L 51/06; C08L 23/10; C08L 23/22

[52] U.S. Cl. .............. 525/74; 525/78; 525/240; 525/241

[58] Field of Search ................... 525/240, 241, 525/74, 78

[56] References Cited

U.S. PATENT DOCUMENTS

| | | | |
|---|---|---|---|
| 3,562,790 | 2/1971 | Coover et al. | 260/876 |
| 4,433,073 | 2/1984 | Sano et al. | 523/201 |
| 4,500,681 | 2/1985 | Shulman | 525/222 |
| 5,013,793 | 5/1991 | Wang et al. | 525/195 |
| 5,051,477 | 9/1991 | Yu et al. | 525/194 |
| 5,051,478 | 9/1991 | Puydak et al. | 525/195 |
| 5,162,445 | 11/1992 | Powers et al. | 525/333.4 |
| 5,356,950 | 10/1994 | White et al. | 522/116 |
| 5,369,182 | 11/1994 | Yu et al. | 525/240 |
| 5,414,044 | 5/1995 | Moriya et al. | 525/74 |

FOREIGN PATENT DOCUMENTS

| | | |
|---|---|---|
| 0214945A2 | 3/1987 | European Pat. Off. . |
| 3901606 | 7/1990 | Germany . |
| 835152 | 5/1960 | United Kingdom . |
| 8567893 | 12/1960 | United Kingdom . |
| 950551 | 2/1964 | United Kingdom . |

*Primary Examiner*—Carman J. Seccuro, Jr.
*Attorney, Agent, or Firm*—Myron B. Kurtzman

[57] ABSTRACT

Crystalline propylene polymer compositions having improved impact strength and improved clarity are disclosed. The composition is prepared by melt blending a propylene polymer, e.g., polypropylene, and from about 1 to 35 wt % of an elastomeric interpolymer of a $C_4$ to $C_8$ isomonoolefin, e.g., isobutylene, and a para alkystyrene comonomer, e.g., para-methylstyrene. The interpolymer preferably contains a benzylic functional group such as halogen (bromine). The composition may also contain from about 0.5 to 15 wt % of the amide reaction product of an organic acid-grafted propylene polymer, e.g., maleic anhydride grafted polypropylene, and a polyfunctional primary amine.

18 Claims, No Drawings

PROPYLENE POLYMER COMPOSITIONS HAVING IMPROVED IMPACT STRENGTH

BACKGROUND OF THE INVENTION

1. Field of the Invention

The invention relates to polypropylene compositions having both improved impact strength and enhanced optical clarity.

2. Description of Related Art

Propylene polymers, e.g., crystalline polypropylene or crystalline copolymers of propylene with up to about 20 wt % of a $C_2$ or $C_4$–$C_8$ alpha-monoolefin such as ethylene, tend to be brittle (brittle point varies from 0° C. to 20° C.) and of poor impact strength at low temperatures. Polypropylene generally exhibits a notched Izod impact strength of less than about 1 ft.-lb/in. at room temperature.

It is generally known in the prior art that the brittle point of polypropylene can be lowered by blending the polymer with minor amounts of an elastomeric polymer such as natural rubber or GRS rubber, as disclosed in UK Patent 856,793.

UK Patent 950551 discloses that the impact properties of isotactic polypropylene are improved by forming blends of the polymer with up to about 28.5 wt % of polyisobutylene and up to about 5 wt % of polyethylene. U.S. Pat. No. 3,562,790 discloses blends of improved impact strength and clarity based on a ternary mixture of polypropylene, from about 2 to 15 wt % of polyethylene (or a copolymer of ethylene with a different alpha-olefin) and about 2 to 20 wt % of an ethylene/propylene/non-conjugated diene elastomer. U.S. Pat. No. 4,500,681 discloses ternary blends containing 20 to 65 wt % isotactic polypropylene, 20 to 60 wt % of an isobutytene polymer such as polyisobutylene, butyl rubber or halogenated butyl rubber and from about 7 to 40 wt % of a copolymer of ethylene and an unsaturated ester of a carboxylic acid such as vinyl acetate.

Similarly, EPA 214945 discloses polypropylene film materials having improved impact strength based on blends of polypropylene with minor amounts of one or more of low density polyethylene, polybutylene, polyisobutylene and/or copolymers of ethylene with methyl acrylate.

While many of these compositions and others give rise to some improvement in propylene polymer impact properties and result in a lowering of the brittle temperature, other properties may suffer, such as reduction in optical clarity with respect to blends containing polyisobutylene or polyolefins such as polyethylene, and a reduction in physical properties such as stiffness and processability with respect to other blends. In addition, the inclusion of relatively large amounts of modifying polymer(s) in blends with polypropylene tends to detract from the normally good tensile strength and modulus properties of pure polypropylene.

U.S. Pat. Nos. 5,013,793, 5,051,477 and 5,051,487 disclose dynamically vulcanizable polymer compositions based on a blend of an elastomeric isobutylene/para-methylstyrene interpolymer, preferably a halogenated interpolymer, one or more olefin polymers and a vulcanizing system for the isobutylene/para-methylstyrene interpolymer. The compositions are cured under high shear mixing conditions to provide a dispersion of fine particles of the cured elastomer dispersed in the olefin polymer matrix.

SUMMARY OF THE INVENTION

The present invention provides for thermoplastic propylene polymer compositions having high impact strength, good clarity and good processability comprising a blend of:

a) a crystalline propylene polymer; and b) an interpolymer of a $C_4$ to $C_7$ isomonoolefin containing from about 0.5 to 20 mole % of copolymerized para-alkylstyrene, said interpolymer present in said composition at a level from about 1 to about 35 wt %.

The invention also provides for a process for improving physical properties of compositions containing crystalline propylene polymers comprising melt mixing the propylene polymer with from about 1 to about 35 wt %, based on polymer content, of an interpolymer of a $C_4$ to $C_7$ isomonoolefin containing from about 0.5 to 20 mole % of copolymerized para-alkylstyrene at a temperature in the range of from about 150° to 250° C. until a uniform blend is obtained.

The isomonoolefin interpolymer may also include functionalized interpolymers prepared by replacing a portion of benzylic hydrogen with functional groups such as methacrylate, halogen or other functional groups.

The composition may also contain from about 0.5 to about 15 wt % of an additional modifier polymer which is the amide reaction product of:

(i) a modified crystalline propylene polymer containing a grafted unsaturated organic compound, said unsaturated compound selected from the group consisting of an unsaturated carboxylic acid, an unsaturated carboxylic acid anhydride and mixtures thereof; and (ii) a polyfunctional primary amine comprising one primary amine group and at least one hydroxyl, secondary amine or tertiary amine group.

The invention provides for crystalline propylene polymer compositions having enhanced impact properties, good processability, and good optical clarity, while substantially retaining the normally good tensile strength and modulus properties inherent to propylene polymers.

DETAILED DESCRIPTION OF THE INVENTION

Crystalline propylene polymers which are present as the major component in the composition of the invention include polypropylene and crystalline copolymers of propylene with up to 20 wt % of a copolymerizable $C_2$ or $C_4$–$C_8$ monoolefin, most preferably ethylene. These polymers are well known in the art and can be prepared by methods well known in the art such as polymerization of propylene or a propylene/monoolefin mixture in the presence of the so called Ziegler/Natta transition catalysts, e.g., a transition metal halide combined with a tri alkyl aluminum compound. The propylene polymers may also be prepared by polymerization in the presence of metallocene containing catalyst systems. Preferred propylene polymers for use in the present invention exhibit a Melt Flow Rate at 230° C. under 2.16 kg. load in the range of from about 0.1 to 1,000, more preferably from about 0.5 to 100 g/10 min.

The $C_4$–$C_7$ isoolefin/para-alkylstyrene interpolymers used in the invention are random elastomeric copolymers of a $C_4$ to $C_7$ isomonoolefin, such as isobutylene and a para-alkylstyrene comonomer, preferably para-methylstyrene containing at least about 80%, more preferably at least about 90% by weight of the para-isomer, and also include functionalized interpolymers wherein at least some of the alkyl substituent groups present in the styrene monomer units contain halogen or some other functional group. Preferred materials may be characterized as isobutylene interpolymers containing the following monomer units randomly spaced along the polymer chain:

1.          and optionally 2.

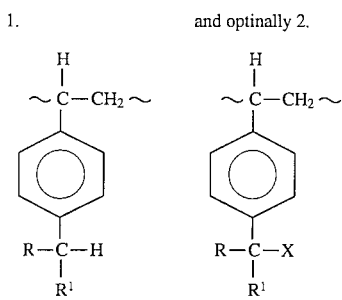

wherein R and R' are independently hydrogen, lower alkyl, preferably $C_1$ to $C_7$ alkyl and X is a functional group such as halogen. Preferably R and R' are each hydrogen. Up to about 60 mole % of the para-alkylstyrene present in the interpolymer structure may be the functionalized structure (2) above.

Where monomer units 2 in the above formula are absent, then the isomonoolefin interpolymer is non-functionalized, i.e., is a random copolymer of isomonoolefin and para-alkylstyrene. The most preferred of such interpolymers are copolymers of isobutylene and paramethylstyrene containing from about 0.5 up to about 20 mole % of para-methylstyrene randomly copolymerized along the polymer chain.

Where monomer units 2 in the above formula are present, the isomonoolefin interpolymer is at least a terpolymer containing from about 0.5 up to 60 mole % of functionalized monomer units 2 based on the content of aromatic monomer units 1 and 2. The functional group X may be halogen or some other functional group incorporated by nucleophilic substitution of benzylic halogen with other groups such as alkoxide, phenoxide, carboxylate, thiolate, thioether, thiocarbamate, dithiocarbamate, thiourea, xanthate, cyanide, malonate, amine, amide, carbazole, phthalamide, maleimide, cyanate and mixtures thereof. These functionalized isomonoolefin interpolymers and their method of preparation are more particularly disclosed in U.S. Pat. No. 5,162,445, the complete disclosure of which is incorporated herein by reference. Most useful of such functionalized materials are elastomeric random interpolymers of isobutylene and para-methylstyrene containing from about 0.5 to about 20 mole % para-methylstyrene wherein up to about 60 mole % of the methyl substituent groups present on the benzyl ring contain an acrylate or methacrylate group, or a bromine or chlorine atom, preferably a bromine atom. These polymers have a substantially homogeneous compositional distribution such that at least 95% by weight of the polymer has a para-alkylstyrene content within 10% of the average para-alkylstyrene content of the polymer. More preferred polymers are also characterized by a narrow molecular weight distribution (Mw/Mn) of less than about 5, more preferably less than about 2.5, a preferred viscosity average molecular weight in the range of from about 200,000 up to about 2,000,000, and a preferred number average molecular weight in the range of from about 25,000 to about 750,000, as determined by Gel Permeation Chromatography.

The interpolymers may be prepared by slurry polymerization of the monomer mixture using a Lewis Acid catalyst, followed by halogenation, preferably bromination, in solution in the presence of halogen and a radical initiator such as heat and/or light and/or a chemical initiator.

Preferred interpolymers are brominated interpolymers which generally contain from about 0.1 to about 5 mole % of bromomethyl groups, most of which is monobromomethyl, with less than 0.05 mole % dibromomethyl substituents present in the copolymer. More preferred interpolymers contain from about 0.05 up to about 2.5 wt % of bromine based on the weight of the interpolymer, most preferably from about 0.05 to 0.75 wt % bromine, and are substantially free of ring halogen or halogen in the polymer backbone chain.

These interpolymers, their method of preparation, their method of cure and graft or functionalized polymers derived therefrom are more particularly disclosed in the above referenced U.S. Pat. No. 5,162,445.

A preferred level of addition of the interpolymer to the propylene 25 polymer composition lies in the range of from about 5 to 35 wt %, more preferably from about 10 to 25 wt %, based on the polymer content of the composition. Another preferred range is from 1 to 20 wt %, more preferably from 10 to 20 wt %.

In a further embodiment of the invention, the compatibility and physical properties of the propylene polymer and interpolymer blend composition may be further enhanced by inclusion of minor amounts of an additive polymer which comprises the amide reaction product of: (i) a modified crystalline propylene polymer which contains from about 0.5 to 0.001 millimoles per polymer gram of an unsaturated organic acid or acid anhydride grafted along the polymer chain, and (ii) a polyfunctional primary amine having one primary amine group and at least one hydroxyl, secondary amine or tertiary amine group.

The preferred modified propylene polymer is crystalline polypropylene which has been modified by reacting polypropylene with an unsaturated organic acid or anhydride in the presence of a free radical initiator under grafting reaction conditions in a reaction zone.

The carboxylic acid may be a mono or polycarboxylic acid, preferably having from 3 to 12 carbon atoms. By way of example, the unsaturated carboxylic acid may be maleic acid, fumaric acid, citraconic acid, mesaconic acid, itaconic acid, himic acid, acetylenedicarboxylic acid and mixtures thereof. The preferred carboxylic acid is maleic acid. Suitable anhydrides include maleic anhydride, citraconic anhydride, itaconic anhydride, and himic anhydride. The preferred anhydride is maleic anhydride.

The acid or anhydride component may be present in the grafted polymer of the present invention in an amount ranging from about 0.5 to 0.001 millimole (mmole) per gram, preferably from about 0.2 to 0.002 mmole per gram, more preferably from about 0.1 to 0.005 mmole per gram of the grafted polymer product.

The grafted polymer is prepared by contacting the propylene polymer and grafting reactant in the presence of a free radical initiator which may be a chemical compound or radiation. Suitable free radical initiators include (1) thermally decomposable compounds which generate radicals such as azo compounds or organic peroxides; (2) compounds which generate free radicals by non-thermal methods such as photochemical or redox processes; (3) compounds which have inherent radical character such as molecular oxygen; or (4) electromagnetic radiation such as X-rays, electron beams, visible light, ultraviolet-light.

Suitable organic peroxide compounds include hydroperoxides, dialkyl peroxides, diacyl peroxides, peroxyesters, peroxydicarbonates, peroxyketals, ketone peroxides and organosulfonyl peroxides.

Preferably, the free radical initiator is an organic peroxide compound having a half-life, at the reaction temperature, of less than one tenth of the reaction/residence time employed.

When the free radical initiator is a compound, suitable molar ratio of free radical initiator compound to the grafting monomer may range from 0.001:1 to 1:1, preferably from 0.01:1 to 0.1:1.

The grafting reaction may be conducted in the absence of a diluent or in the presence of a diluent.

When a diluent is present in the reaction zone, suitable diluents include saturated aliphatic hydrocarbons, aromatic hydrocarbons, and perhalogenated hydrocarbons.

Preferably, the grafting reaction to produce the grafted polymer is conducted in the absence of a diluent and in the melt phase, wherein the propylene polymer is in the molten phase. The reaction temperature is chosen to be appropriate for the initiator used.

In a preferred embodiment, the grafting process is carried out in a twin screw extruder having, in sequence, screw elements, which will (i) heat the polymer by shear and compression to or close to the desired reaction temperature, (ii) mix the polymer at or close to reaction temperature with the grafting agent, (iii) mix the polymer containing the grafting agent with the initiator, (iv) allow appropriate residence time for the grafting reaction, (v) allow venting of unreacted grafting agent and initiator coproducts, (vi) allow mixing of any desired stabilizers or additives and (vii) forward the reacted, vented, stabilized polymer to an appropriate finishing devices, e.g. a pelletizer.

Suitable processes for preparing these modified polypropylene graft polymers are disclosed in U.S. Pat. No. 3,862,265, the complete disclosure of which is incorporated herein by reference.

The amide derivative of the graft-modified propylene polymer may be then prepared by contacting the graft modified propylene polymer with at least a stoichiometric quantity of the polyfunctional primary amine compound described above under conditions wherein at least a portion of the amine is caused to react with the carboxylic functionality present along the propylene polymer backbone to form the amide reaction product. The reaction is preferably carried out in the absence of a diluent at 150° to 250° C. in the melt phase.

Compatibility of the three component blend comprising the propylene polymer, the functionalized, e.g., halogenated, isomonoolefin interpolymer and the amide-modified propylene polymer may be further enhanced by inclusion in the composition of a catalyst which promotes an electrophilic substitution reactions. Examples of such catalysts include Zinc oxide, magnesium oxide, Zinc bromide, ferric chloride and the like. These promoters may be added at a level of about 0.01 to about 1.5 wt %, more preferably from about 0.05 to 0.5 wt %, based on the content of functionalized, e.g., brominated, isomonolefin interpolymer present in the composition.

Compositions of the invention will generally contain from about 1 to 35 wt %, more preferably from about 5 to about 30 wt % of the isomonoolefin interpolymer, based on the polymer content of the composition. The graft modified propylene polymer, if used in the composition, may be present in the composition at a level of from about 0.5 to about 15 wt %, more preferably from about 1 to about 10 wt %, based on the polymer content of the composition.

Other thermoplastic polymers may also be blended with the propylene polymer and isoolefin interpolymer at levels of up to about 20 wt % of the composition to further modify the properties of the composition. These polymers include polyethylene, ethylene/propylene copolymers, terpolymers of ethylene/propylene and a non-conjugated diene such as dicyclopentadiene, 1,4-hexadiene or ethylidene norbornene, copolymers of ethylene with vinyl acetate or a lower alkyl (meth)acrylate, copolymers and block copolymers of butadiene with styrene, and like materials.

The composition of this invention may also include effective amounts of other ingredients normally included in polypropylene compositions including antioxidants, pigments, colorants, fillers, plasticizers and the like.

However, the compositions of this invention and polymer components present in the composition are not intended to be vulcanized or cross-linked and thus the compositions are free of agents which cure the composition or any component thereof, e.g., the isomonodefin/p-alkylstyrene copolymer.

The blends may be prepared by combining all the polymer components under shear mixing conditions using any suitable melt mixing device such as a Banbury Mixer, Brabender mixer or a mixer/extruder. Preferred melt mixing temperatures are in the range of from about 150° C. to about 250° C., more preferably from about 170° C. to about 230° C., for a period of mixing time sufficient to achieve a uniform dispersion of the polymer components within the matrix propylene polymer, usually about 0.5 to 4 minutes.

The following examples are illustrative of the invention. Components identified in the examples are as follows:

PP-5052: polypropylene homopolymer manufactured by Exxon Chemical Company having a melt flow rate of 1.3 g/10 min, measured under 2.16 kg. load at 230° C. (ESCORENE™).

PP-1042: polypropylene homopolymer manufactured by Exxon Chemical Company having a melt flow rate of 1.9 g/10 min, measured under 2.16 kg. load at 230° C. (ESCORENE™).

I-PMS-1: a copolymer of isobutylene and para-methylstyrene (PMS) having a PMS content of about 2.2 mole % and a Mooney viscosity of 50 (ML, 1+8, 125° C.).

I-PMS-2: a copolymer of isobutylene and para-methylstyrene (PMS) having a PMS content of about 5 wt % and a Mooney viscosity of 35 (ML, 1+8, 125° C.).

Br-IPMS-1: a brominated isobutylene/PMS interpolymer having a
PMS content of about 1.5 mole %, a p-bromomethylstyrene content of about 0.7 mole % and a Mooney viscosity of 46, (ML, 1+8, 125° C.).

Br-IPMS-2: a brominated isobutylene/PMS interpolymer having a PMS content of about 5 wt %, a bromine content of about 0.5 mole % and a Mooney viscosity of 35, (ML, 1,+8, 125° C.).

BrIPMS (ZnO): Br-IPMS-2 diluted with about 1 wt % ZnO powder.

MAE-XP-3: a methacrylated isobutylene/PMS interpolymer having a PMS content of 5 wt %, a methacrylate content of 0.3 mole % and a Mooney viscosity of 35 (ML, 1,+8, 125° C.).

MAE-XP-7: a methacrylated isobutylene/PMS interpolymer having a PMS content of 5 wt %, a methacrylate content of 0.7 mole % and a Mooney viscosity at 35 (ML, 1,+8, 125° C.).

PIB-L-120: a polyisobutylene homopolymer having a viscosity average molecular wt of 166,000, made by Exxon Chemical Co. (VISTANEX™).

ADDITIVE B: Product prepared by the reaction of a maleic anhydride grafted polypropylene (maleic anhydride content of 1.0 wt %) having a melt flow rate (2.16 kg load at 190° C.) of 184 g/10 min with 1.5 moles of a polyfunctional primary amine per mole of maleic anhydride present. Reactions were carried out in a Brabender mixer at 210° C. with a reaction time of 3 minutes. The cooled product was granulated and the granules were extracted with refluxing methylene chloride to remove unreacted polyfunctional primary amine.

ADDITIVE B-1: Additive B where the polyfunctional primary amine is 2-(2-aminoethylamino) ethanol.

ADDITIVE B-2: Additive B where the polyfunctional primary amine is 1-(2-aminoethyl) piperazine.

Mechanical tests were obtained by molding extruded pellets of the test compositions into mechanical molding bars using a 15 ton Boy$^R$ injection molding machine. Tests were performed according to the following ASTM procedures:

| Test | Test Method |
|---|---|
| IZOD Impact | ASTM D-256 |
| Flexural Modulus | ASTM D-790 |
| Yield Strength | ASTM D-638 |
| Elongation @ Yield | ASTM D-638 |

Comparative Example 1

Escorene® PP 5052 was molded into 5"×0.5"×0.125" bars on a Boy™ injection molding machine. After 24 hours, the notched Izod impact strength (ASTM procedure D 256) and flexural modulus (ASTM procedure D 790) of the molded samples were measured and are recorded in Table 1 for comparison with examples of the present invention.

Examples 2 and 3

Escorene$^R$ PP 5052 (200 g) was charged to a preheated 300 ml Brabender mixer and brought to 170° C. by mixing with a rotor speed of 60 rpm. The I-PMS-1 or Br-IPMS-1 copolymers (50 g) were added and mixing continued for an additional 3 minutes. The blend was discharged, allowed to cool to room temperature and granulated. Specimens were molded and their physical properties measured as in comparative Example 1. The results are recorded in Table 1 and show a modest increase in room temperature Izod impact strength for the isobutylene/PMS copolymer-containing blend over the unblended polypropylene and a dramatic increase for the isobutylene/BrPMS copolymer-containing blend.

Examples 4 and 5

Escorene$^R$ PP 5052 (180 g) was charged to a preheated 300 ml Brabender mixer and brought to 170° C. by mixing with a rotor speed of 60 rpm. The isobutylene/BrPMS copolymer (50 g) was added followed by additive B-1 or B-2 (20 g). Mixing was continued for an additional 3 minutes. The blend was discharged, allowed to cool to room temperature and granulated. Specimens were molded and their physical properties measured as in comparative Example I. The results are also recorded in Table 1.

Inclusion of additives B 1 and B2 (Examples 4 and 5) leads to a blend with a room temperature Izod impact strength greater than that of the blend with no additive (Example 3).

TABLE 1

| Composition (wt %) | Example | | | | |
|---|---|---|---|---|---|
| | 1 | 2 | 3 | 4 | 5 |
| PP 5052 | 100 | 80 | 80 | 72 | 72 |
| I-PMS-1 | — | 20 | — | — | — |
| Br-IPMS-1 | — | — | 20 | 20 | 20 |
| ADDITIVE B-1 | — | — | — | 8 | — |
| ADDITIVE B-2 | — | — | — | — | 8 |
| NOTCHED IZOD (Ft/LB/in) | | | | | |
| +23° C. | 0.5 | 3.2 | 11.9 | 14.2 | 15.2 |
| −20° C. | — | — | 0.4 | 1.0 | 0.6 |
| FLUXURAL MOD. (kpsi) | 153 | 105 | 105 | 112 | 114 |

Additional formulations having the composition shown in Table 2 were prepared as described above except that mixing was conducted in a mixing extruder at a temperature of about 200° C. Results of mechanical testing of these compositions are shown in Table 2.

The data from Table 2 demonstrate that copolymers of isobutylene and 4-methylstyrene and their derivatives are much more effective impact modifiers for polypropylene than isobutylene homopolymers.

In Table 2, Ex. 6 shows data for the unmodified polypropylene (Exxon Chemical PP 1042). Examples 7–11 show data for blends with polyisobutylene. While the notched Izod impact strength at room temperature is increased, it is less than that observed for similar blends with an isobutylene/4-methylstyrene copolymer, shown in Examples 12–16. The effect with an isobutylene/4-methylstyrene copolymer modifier is particularly marked at blend concentrations of 20 and 25% (compare Examples 15 and 16 with Examples 10 and 11). A brominated isobutylene/4-methylstyrene copolymer (Examples 30 through 33) gives results comparable to those obtained with the unbrominated copolymer.

Blends with two methacrylate-modified isobutylene/4-methylstyrene copolymers (Examples 17 through 20 and 21 through 24) show a toughening effect intermediate between that of isobutylene homopolymer and the unmodified isobutylene/4-methylstyrene copolymer.

The notched Izod Impact Strength of the composition containing zinc oxide dusted brominated isobutylene/4-methylstyrene copolymer is poorer than that of the undusted modifier at 20% blend concentration (comparing Examples 28 and 32), but comparable at 25% (compare Examples 29 and 33). This indicated that use of a crosslinked Br-IPMS elastomer is detrimental to the impact strength of the polypropylene/Br-IPMS blends.

In addition to the quantitative data shown in Table 2, it is observed that the blends made with isobutylene/4-methylstyrene copolymers show superior optical clarity to those made with isobutylene homopolymer. This is consistent with better (though unexpected) compatibility of the copolymers with polypropylene.

TABLE 2

| Composition | Example | | | | | | | | | | | | | |
|---|---|---|---|---|---|---|---|---|---|---|---|---|---|---|
| | 6 | 7 | 8 | 9 | 10 | 11 | 12 | 13 | 14 | 15 | 16 | 17 | 18 | 19 |
| PP-1042 | 100 | 95 | 90 | 85 | 20 | 25 | 95 | 90 | 85 | 80 | 75 | 95 | 90 | 85 |
| PIB-L 120 | | 5 | 10 | 15 | 20 | 25 | | | | | | | | |
| I-PMS-2 | | | | | | | 5 | 10 | 15 | 20 | 25 | | | |
| MAE-XP3 | | | | | | | | | | | | 5 | 10 | 15 |
| MAE-XP7 | | | | | | | | | | | | | | |
| Br-IPMS-ZnO | | | | | | | | | | | | | | |
| Br-IPMS-2 | | | | | | | | | | | | | | |
| NI-RT ft-lb/in | 0.8 | 1.0 | 1.2 | 1.7 | 2.1 | 3.4 | 0.8 | 1.5 | 3.4 | 10.7 | 11.8 | 1.0 | 1.3 | 1.9 |
| NI-0° C. ft-lb/in | | 0.36 | 0.50 | 0.56 | 0.65 | 0.86 | 0.34 | 0.34 | 0.47 | 0.63 | 0.77 | 0.33 | 0.37 | 0.51 |
| NI-10° C. ft-lb/in | | 0.33 | 0.37 | 0.55 | 0.59 | 0.70 | 0.33 | 0.31 | 0.36 | 0.55 | 0.53 | 0.32 | 0.37 | 0.36 |

| Composition | Example | | | | | | | | | | | | | |
|---|---|---|---|---|---|---|---|---|---|---|---|---|---|---|
| | 20 | 21 | 22 | 23 | 24 | 25 | 26 | 27 | 28 | 29 | 30 | 31 | 32 | 33 |
| PP-1042 | 80 | 95 | 90 | 85 | 80 | 95 | 90 | 85 | 80 | 75 | 90 | 85 | 80 | 75 |
| PIB-L 120 | | | | | | | | | | | | | | |
| I-PMS-2 | | | | | | | | | | | | | | |
| MAE-XP3 | 20 | | | | | | | | | | | | | |
| MAE-XP7 | | 5 | 10 | 15 | 20 | | | | | | | | | |
| Br-IPMS-ZnO | | | | | | 5 | 10 | 15 | 20 | 25 | | | | |
| Br-IPMS-2 | | | | | | | | | | | 10 | 15 | 20 | 25 |
| NI-RT ft-lb/in | 5.2 | 1.1 | 1.5 | 2.4 | 3.5 | 1.0 | 1.2 | 1.5 | 2.4 | 11.3 | 1.7 | 2.1 | 9.6 | 12.2 |
| NI-0° C. ft-lb/in | 0.60 | 0.33 | 0.5 | 0.75 | 0.95 | | | | | | | | | |
| NI-10° C. ft-lb/in | 0.56 | 0.34 | 0.36 | 0.56 | 0.76 | | | | | | | | | |

We claim:

1. A thermoplastic polymer composition comprising a blend of:

a) a crystalline propylene polymer;

b) an interpolymer of a $C_4$ to $C_7$ isomonoolefin containing from about 0.5 to about 20 mole % of copolymerized para-alkylstyrene, said interpolymer present in said composition at a level of from about 1 to about 35 wt %, based on the polymer content of said composition, and from about 0 5 to about 15 wt % of an additive polymer comprising the amide reaction product of:

(i) a modified crystalline propylene polymer containing a grafted unsaturated organic compound, said unsaturated organic compound selected from the group consisting of an unsaturated carboxylic acid, an unsaturated carboxylic acid anhydride and mixtures thereof; and (ii) a polyfunctional primary amine having one primary amine group and at least one hydroxyl, secondary amine or tertiary amine group.

2. The composition of claim 1 wherein said propylene polymer is selected from the group consisting of polypropylene and copolymers of propylene with up to about 20 wt % of a $C_2$ or $C_4$–$C_8$ alpha-monoolefin.

3. The composition of claim 1 wherein said isomonoolefin is isobutylene and said para-alkylstyrene is para-methylstyrene.

4. The composition of claim 1 wherein said interpolymer is present in said composition at a level of from about 5 to about 30 wt %.

5. The composition of claim 1 wherein said interpolymer comprises a polymer of isobutylene containing the following aromatic monomer units randomly spaced along the polymer chain:

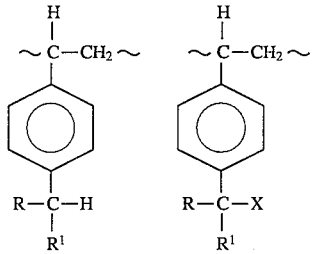

wherein R and R' are independently hydrogen or $C_1$ to $C_4$ alkyl, and X is a functional group.

6. The composition of claim 5 wherein the X-containing monomer units comprise from about 0.5 to 60 mole % of the total content of said aromatic monomer units present in said interpolymer.

7. The composition of claim 5 wherein X is halogen.

8. The composition of claim 7 wherein R and R" are each hydrogen and X is bromine present in said interpolymer at a level of less than about 2.5 wt %.

9. The composition of claim 8 wherein bromine is present in said interpolymer at a level of from about 0.05 to about 0.75 wt %.

10. The composition of claim 1 wherein said propylene polymer is polypropylene.

11. The composition of claim 1 wherein said unsaturated organic compound is maleic anhydride.

12. The composition of claim 1 wherein said primary amine is selected from the group consisting of 2-(2-aminoethylamino) ethanol and 1-(2-aminoethyl) piperazine.

13. The composition of claim 1 wherein said interpolymer is present in said composition at a level of from about 10 to 25 wt %.

14. The composition of claim 1 wherein said interpolymer is present in said composition at a level of from about 1 to 20 wt %.

15. The composition of claim 1 wherein said interpolymer is present in said composition at a level of from about 10 to 20 wt %.

16. A process for preparing a thermoplastic polymer blend comprising:

(a) forming a mixture comprising a crystalline propylene polymer, from about 1 to 35 wt % of an interpolymer of a $C_4$ to $C_7$ isomonoolefin containing about 0.5 to 20 mole % of copolymerized para-alkylstyrene, and from about 0.5 to about 15 wt % of an additive polymer comprising the amide reaction product of:

(i) a modified crystalline propylene polymer containing a grafted unsaturated organic compound, said unsaturated organic compound selected from the group consisting of an unsaturated carboxylic acid, an unsaturated carboxylic acid anhydride and mixtures thereof; and (ii) a polyfunctional primary amine having one primary amine group and at least one hydroxyl, secondary amine or tertiary amine group; and (b) melt mixing said mixture at a temperature in the range of about 150° to 250° C. until a uniform blend is obtained.

17. The process of claim 16 wherein said interpolymer comprises a brominated polymer of isobutylene and para-methylstyrene containing bromine at a level of from 0.05 to about 0.75 wt %.

18. A shaped article prepared by heat shaping the composition of claim 1.

* * * * *